(12) United States Patent
Turner et al.

(10) Patent No.: US 8,045,289 B2
(45) Date of Patent: Oct. 25, 2011

(54) DATA TRANSFER APPARATUS FOR USE WITH TAPE CARTRIDGES HAVING A HELICAL CAMMED SURFACE AND TAPE CARTRIDGES HAVING CAMMED SURFACE FOR USE WITH SUCH DATA TRANSFER APPARATUS

(75) Inventors: Philip Turner, Frenchay (GB); James West, Bristol (GB); Mark Digby Teucher, Bristol (GB); Andrew Mark Fernihough, Batheaston Bath (GB); Mark Dillon, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 12/023,153

(22) Filed: Jan. 31, 2008

(65) Prior Publication Data
US 2008/0198504 A1  Aug. 21, 2008

(30) Foreign Application Priority Data

Jan. 31, 2007 (GB) .................................. 0701781.7

(51) Int. Cl.
*G11B 5/008* (2006.01)
(52) U.S. Cl. ...................... 360/96.3; 242/342
(58) Field of Classification Search ............. 360/96.3, 360/96.4, 132; 242/342
See application file for complete search history.

(56) References Cited

U.S. PATENT DOCUMENTS

| 2,894,700 | A | * | 7/1959 | Roberts et al. | ............... 242/340 |
| 2,926,861 | A | * | 3/1960 | Murdoch | ................. 242/343.2 |
| 3,819,131 | A | | 6/1974 | Inaga | |
| 4,234,140 | A | * | 11/1980 | Van Nie et al. | ............... 242/340 |
| 4,284,250 | A | | 8/1981 | Plachy et al. | |
| 4,562,497 | A | | 12/1985 | Morinaga et al. | |
| 4,887,775 | A | | 12/1989 | Kanaguchi et al. | |
| 5,172,872 | A | | 12/1992 | Barton, Jr. | |
| 5,183,219 | A | | 2/1993 | Abeille et al. | |
| 5,881,960 | A | | 3/1999 | Christie | |
| 7,040,564 | B1 | | 5/2006 | Veno et al. | |

FOREIGN PATENT DOCUMENTS

| GB | 1425980 | | 2/1976 |
| GB | 2334945 | A | 9/1999 |
| GB | 2403585 | A | 1/2005 |
| JP | 59215056 | A | 12/1984 |

OTHER PUBLICATIONS

UK Intellectual Property Office Search Report dated May 22, 2007; App. No. GB0701781.7.

* cited by examiner

*Primary Examiner* — A. J. Heinz

(57) ABSTRACT

A tape cartridge includes a housing and a tape reel that is rotatable about an axis of rotation. The tape reel is adapted to cooperably engage a reel drive member of a data transfer apparatus that, in use, applies a drive torque to the tape reel to rotate the tape reel about the axis of rotation. The cooperable engagement of the tape reel and reel drive member is such as to secure the tape reel to the reel drive member to at least substantially prevent tipping of the tape reel with respect to the reel drive member.

17 Claims, 3 Drawing Sheets

DATA TRANSFER APPARATUS FOR USE WITH TAPE CARTRIDGES HAVING A HELICAL CAMMED SURFACE AND TAPE CARTRIDGES HAVING CAMMED SURFACE FOR USE WITH SUCH DATA TRANSFER APPARATUS

CROSS-REFERENCE TO A RELATED APPLICATION

The present application claims the benefit of, and incorporates by reference, Great Britain Application No. 0701781.7, filed Jan. 31, 2007, and entitled "Data Transfer Apparatus for Use with Tape Cartridges and Tape Cartridges for Use with such Data Transfer Apparatus."

BACKGROUND

Tape is a widely used medium for storing data. Tape cartridges are a popular format for storing data on tape, as they are usually smaller and less expensive than reel-to-reel tapes and the cartridge shell provides suitable protection for the tape media. Tape cartridges may be dual reel or single supply reel cartridges. A dual reel tape cartridge houses two reels and, in use, the tape is transferred from one reel to the other past a transducer, which may be a read device, a write device or a read/write device. A single supply reel cartridge has a single tape reel and, in use, the tape is transferred between the single supply reel and a take up reel that is an integral part of the data transfer apparatus.

Referring to FIG. 1, tape cartridges 10 are often loaded into data transfer apparatus by pushing the cartridge through an opening in the apparatus into a cartridge loading device. The cartridge loading device automatically moves the cartridge inwards and downwards to register on locating points and engage the tape reel(s) 12 with a drive member(s) 14 that engage(s) in a recess in the tape reel to transmit rotary motion to the tape reel. This process requires that the tape cartridge 10 must be clear of the drive member(s) 14 when it is loaded into the data transfer apparatus. Providing that clearance puts physical constraints on the sizing of the data transfer apparatus in the direction indicated by the arrow 16.

Data transfer apparatus for use with computers is typically designed to fit in a standard fixed-size bay. Historically, one of the most popular sizes (width) of tape used in tape cartridges for data transfer apparatus used in conjunction with computers has been approximately 4 mm. The demand for tapes with a greater storage area has led manufacturers to increase the length of the tapes used and, in more recent times, has led to an increased usage of wider tapes (for example 8 mm wide tapes). Since the height of a tape cartridge is at least slightly greater than that of the tape it houses, the use of wider tapes has presented designers with the problem of trying to fit larger cartridges into the same size of apparatus, or at least data transfer apparatus that will fit into a standard size bay.

SUMMARY OF THE INVENTION

The invention provides a tape cartridge comprising a tape reel that is rotatable about an axis of rotation and adapted to cooperably engage a reel drive member of a data transfer apparatus which, in use, applies a drive torque to the tape reel to rotate the tape reel about said axis of rotation, said tape reel having opposite ends with a centre height that is midway between said ends and being adapted to receive a free end portion of a said reel drive member through one of said ends such that said cooperable engagement between the tape reel and the reel drive member takes place internally of the tape reel at a location or locations between said centre height and said one of the ends, and said cooperable engagement being such as to secure the tape reel to the reel drive member to at least substantially prevent tipping of the tape reel with respect to said reel drive member.

The invention also includes a data transfer apparatus for use with tape cartridges comprising a tape reel, said apparatus being arranged to receive at a loaded position tape cartridges containing a tape having a specified width wound on a tape reel that has opposed ends and a centre height that is midway between said ends and comprising a reel drive member for cooperably engaging a said tape reel of a tape cartridge received at said loaded position, said reel drive member having a portion for entering the tape reel through one of said ends such that said cooperable engagement between the tape reel and reel drive member takes place internally of the tape reel at a location or locations disposed between said centre height and said one of the ends and said cooperable engagement being such as to secure the tape reel to the reel drive member to at least substantially prevent tipping of the tape reel with respect to the reel drive member when, in use, said reel drive member applies a torque to rotate said tape reel about said axis of rotation.

The invention also includes a tape cartridge comprising a tape reel that is rotatable about an axis of rotation and adapted to cooperably engage a reel drive member of a data transfer apparatus by rotation of the reel drive member relative to the tape reel in a direction for winding tape onto the tape reel, said cooperable engagement being such as to releasably fix the tape reel to the reel drive member such as to at least substantially prevent tipping of the tape reel with respect to said reel drive member when, in use, said reel drive member applies a drive torque to said tape reel in said direction for winding tape onto the tape reel.

The invention also includes a data transfer apparatus for use with tape cartridges comprising a tape reel, said apparatus comprising a reel drive member for cooperably engaging a tape reel of a tape cartridge received by the apparatus by rotation of said reel drive member relative to said tape reel, said cooperable engagement being such as to fix the tape reel to the reel drive member to at least substantially prevent tipping of the tape reel with respect to the reel drive member when, in use, said reel drive member applies a drive torque to said tape reel on said direction for winding tape onto the tape reel.

The invention also includes a method of operating a data transfer apparatus for use with tape cartridges, said method comprising bringing a tape reel of a said tape cartridge that is rotatable about an axis of rotation into cooperable engagement with a reel drive member of the data transfer apparatus such that the tape reel is secured to the reel drive member such as to at least substantially prevent tipping of the tape reel with respect to the reel drive member, the tape reel having opposed ends and a centre height midway between said ends and being adapted to receive a free end portion of the reel drive member and said cooperable engagement between the tape reel and the reel drive member being at a location or locations between said centre height and an opening through which said free end portion enters the tape reel.

The invention also includes a tape cartridge comprising a housing and a tape reel that is rotatable about an axis of rotation and adapted to cooperably engage a reel drive member of a data transfer apparatus which, in use, applies a drive torque to the tape reel to rotate the tape reel about said axis of rotation, said cooperable engagement being such as to secure the tape reel to the reel drive member to at least substantially prevent tipping of the tape reel with respect to said reel drive member.

The invention also includes a data transfer apparatus for use with tape cartridges comprising a tape reel, said apparatus comprising a reel drive member for cooperably engaging a tape reel of a tape cartridge received by the apparatus and applying a torque to rotate said tape reel about an axis of rotation, said cooperable engagement being such as to secure the tape reel to the reel drive member to at least substantially prevent tipping of the tape reel with respect to the reel drive member.

The invention also includes a method of operating a data transfer apparatus for use with tape cartridges, said method comprising bringing a tape reel of a said tape cartridge that is rotatable about an axis of rotation into cooperable engagement with a reel drive member of the data transfer apparatus such that the tape reel is secured to the reel drive member such as to at least substantially prevent tipping of the tape reel with respect to the reel drive member.

The invention also includes a data transfer system comprising:

a tape cartridge comprising a tape reel provided with engaging means, said tape reel having opposed ends and a centre height midway between said ends; and a data transfer apparatus for exchanging data with a said tape cartridge received at a loaded position therein, said data transfer apparatus comprising reel drive means rotatable about an axis of rotation for applying a torque to a said tape reel of a said tape cartridge which is received at said loaded position and having cooperating engagement means for cooperably engaging the engaging means of the said tape reel;

wherein when said cooperating engagement means engages said engaging means, a free end portion of the reel drive means extends past one of said ends of the tape reel such that a free end thereof is disposed between said one end and the centre height of the tape reel and the cooperating engagement is such as to press the tape reel against the reel drive means such as to at least substantially prevent tipping of the tape reel with respect to the reel drive means.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
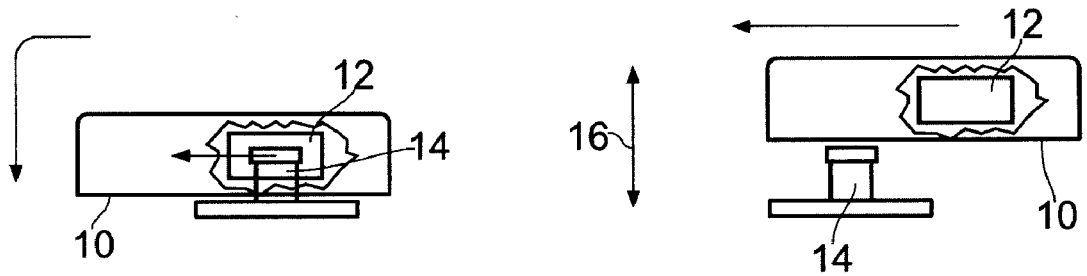
FIG. 1 is a schematic illustration of a prior art tape cartridge moving between its unloaded and loaded positions in a prior art data transfer apparatus.
Figure 2:
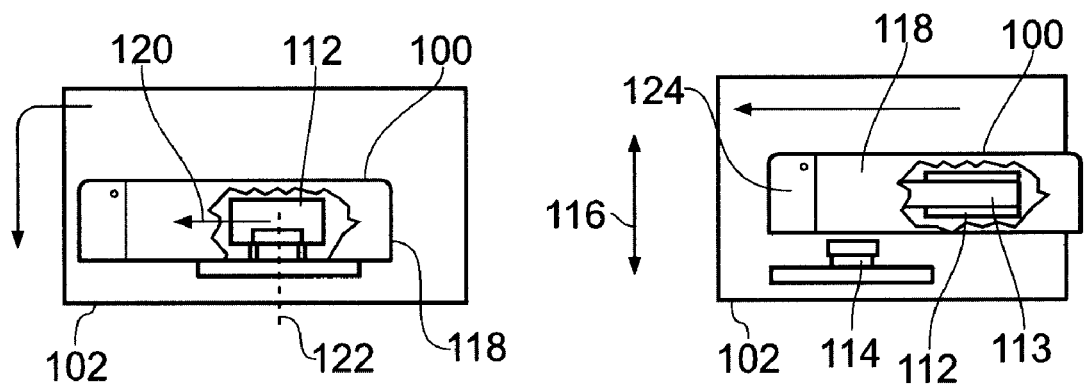
FIG. 2 is a schematic illustration of an embodiment of a data transfer apparatus and a tape cartridge incorporating features of the invention.
Figure 3:
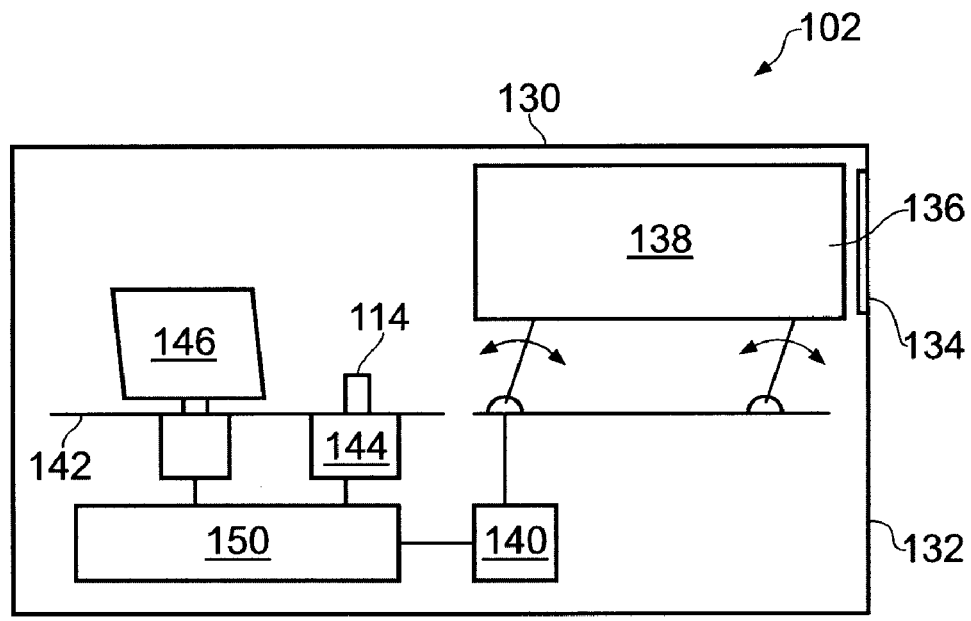
FIG. 3 is schematic illustration of the data transfer apparatus of FIG. 2.

FIG. 2 is a schematic illustration of a tape cartridge 100 moving between unloaded and loaded positions in a data transfer apparatus 102 that is shown in more detail in FIG. 3. The tape cartridge 110 is a DDS-style format data tape cartridge for use in data exchange with a computer (for example, a tape cartridge that complies with the DAT 72 or DAT 160 formats). The tape cartridge 100 comprises a pair of tape reels 112 (only one of which can be seen in the drawing). The tape reels 112 are disposed in parallel spaced apart relation and a magnetic tape 113 (FIG. 2) has its respective ends secured to the tape reels such that it can be wound back and forth between them in a conventional manner. The magnetic tape has a width of approximately 8 mm.

The data transfer apparatus 102 is a digital data transfer apparatus for use in data exchange with a computer. The data transfer apparatus has respective reel drive members 114 (only one of which can be seen in FIGS. 2 and 3), which are disposed in parallel spaced apart relation for engaging and driving the tape reels 112 of a tape cartridge 100 received in the data transfer apparatus 102. The reel drive members 114 have a reduced height (i.e., the dimension in the axial direction indicated by the arrow 116) as compared with the prior art reel drive member 14. This provides clearance between the reel drive members 114 and the tape cartridge 100 while the tape cartridge is being loaded, while also reducing the space requirement in the direction indicated by the arrow 116. As result, although the cartridge tape width is approximately double that of the popular 4 mm size, a doubling of the available space in the direction of arrow 116 is not required. This provides the designer with greater freedom in designing the data transfer apparatus such that it will still fit in a standard sized bay.

When the tape cartridge 100 is in the loaded position, the reel drive members 114 project into the tape cartridge through respective apertures (not shown) provided in the underside of the tape cartridge housing 118 and engage in the tape reels 112. Due to the reduced height of the reel drive members 114, they do not extend as far as the centre height of the tape reels 112 (the centre height is indicated in FIG. 2 by the arrow 120), which in this embodiment is coincident with the longitudinally extending centre line of the tape 113. As a consequence, the load applied to the tape reels 112 when the magnetic tape is tensioned acts above respective pivot points formed by the free ends of the reel drive members and could cause one or both tape reels 112 to tip with respect to the axis of rotation of the reel drive member with which it is engaged. Tipping of the tape reels 112 may have an adverse effect on the tape control within the data transfer apparatus 102. As described in more detail below, the tape reels 112 and reel drive members 114 are provided with features that operate to prevent such tipping.

Referring to FIG. 3, the data transfer apparatus 102 comprises a housing 130 that has a facia panel 132 provided with a rectangular opening through which tape cartridges 100 can be inserted into the apparatus. The opening is normally closed by a pivot-mounted door 134 that can be pushed out of the way (as indicated by the arrow 136) to permit the insertion of tape cartridges into the data transfer apparatus 102. A cartridge loading device 138 is provided adjacent the opening for transporting tape cartridges from the opening to a loaded position at which the reel drive members 114 cooperably engage the tape reels 112. The cartridge loading device 138 may be of any known type and is typically powered by a servo motor 140.

The data transfer apparatus 102 has a chassis 142 on which the reel drive members 114 are mounted together with the respective direct drive motors 144 by which they are driven. A transducer 146 is also mounted on the chassis 142. The transducer 146 may be a read, a write or a read/write device. In this embodiment, the transducer 146 is a rotary helical scanning drum for reading and writing to magnetic tape using a DDS-style format. A tape transport mechanism (not shown) for drawing the magnetic tape from the tape cartridge 100 and guiding it into contact with the transducer 146 is also mounted on the chassis 142. Any suitable known tape transport mechanism can be used and since transducers and tape transport mechanisms are features well known to those skilled in the art, they will not be described in further detail herein.

The data transfer apparatus 102 additionally comprises a controller 150 that supervises operation of the reel drive members 114, cartridge loading device 138, transducer 146 and the transport mechanism and manages the flow of data to be recorded in or read from a tape cartridge 100 received in the apparatus. These and other features of known data transfer apparatus that may be suitably incorporated in the data transfer apparatus 102 will be known to those skilled in the art and so will not be described in further detail herein.

There now follows a detailed description of the tape reels 112 and reel drive members 114. For ease of description, each will be described in the singular. However, it is to be understood that unless it is said otherwise, the described features of the one are common to both of the pair.

Figure 4:
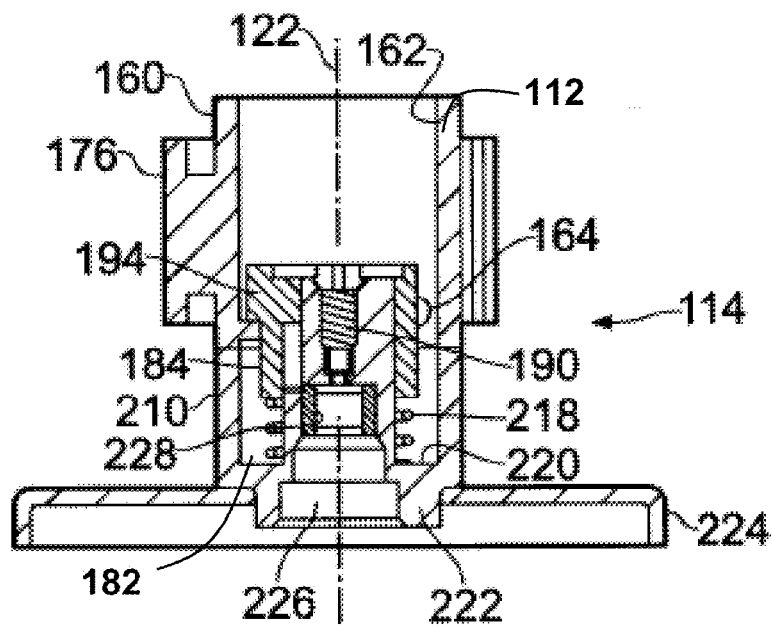
FIG. 4 is a sectional view on line IV-IV of FIG. 5 showing features of an assembly comprising a reel drive member and tape reel of the data transfer apparatus and tape cartridge of FIG. 2.
Figure 5:
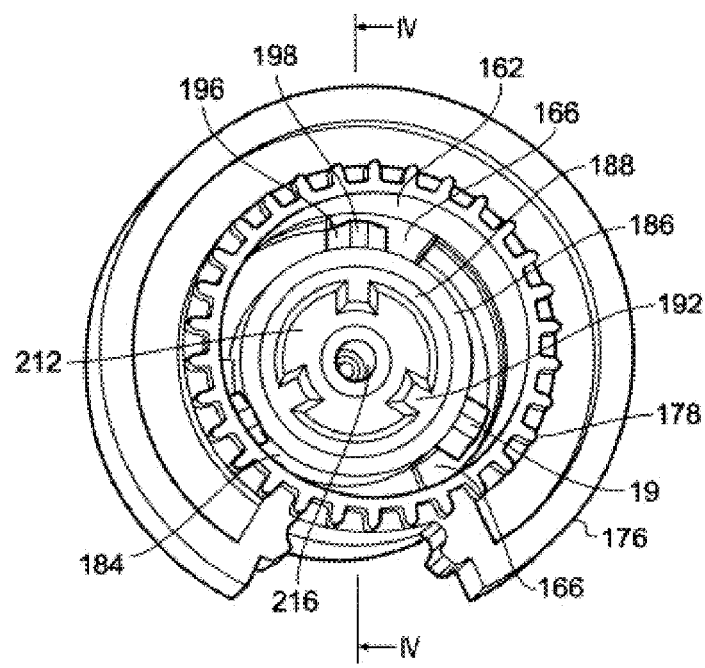
FIG. 5 is a perspective view of the assembly of FIG. 4 seen from above as viewed in FIG. 4.
Figure 6:
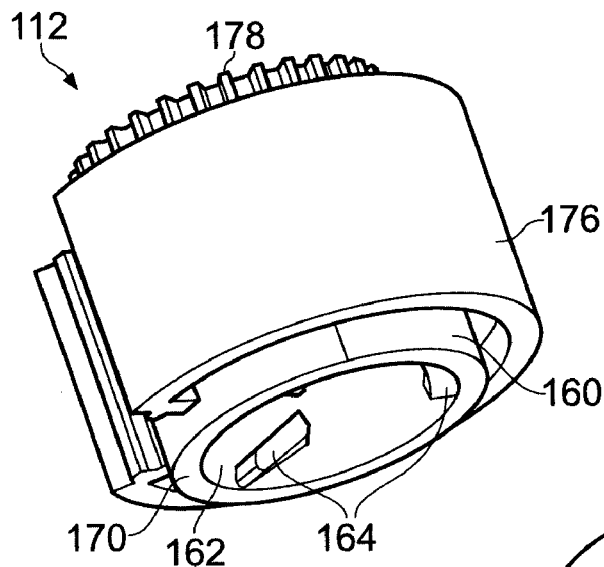
FIG. 6 is a perspective view of the tape reel of FIG. 4 seen from below as viewed in FIG. 4.
Figure 7:
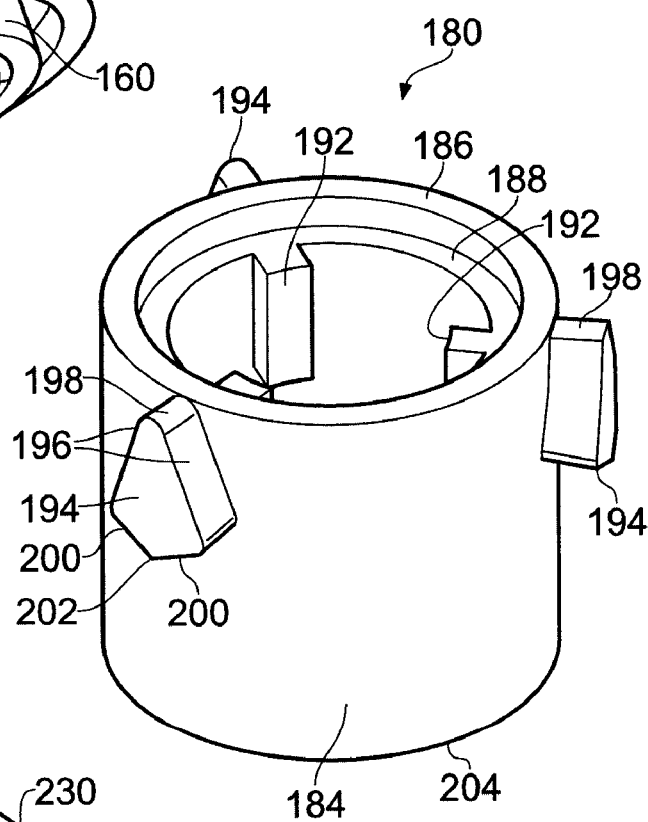
FIG. 7 is a perspective view of a first part of the reel drive member of FIG. 4 as viewed from above in FIG. 4.

Referring to FIGS. 4 to 6, the tape reel 112 comprises a tubular hub 160 that has an inner cylindrical surface 162 provided with three engagement formations 164. The engagement formations 164 project radially from the inner cylindrical surface 162 and are angularly equi-spaced about the axis of rotation 122 of the tape reel. Each engagement formation 164 has a ramp face that defines a camming surface 166 (FIG. 5) for cooperably engaging engagement formations of the reel drive member 114 that are described in detail below.

The tape reel 112 has an end face that defines an annular locating surface 170 that is perpendicular to the axis of rotation. The locating surface 170 faces the wall of the cartridge housing 118 that is provided with the apertures through which the reel drive members 114 enter the housing to engage the tape reels 112.

The camming surfaces 166 extend circumferentially with respect to the inner cylindrical surface 162. Each camming surface 166 has one end disposed closer to the locating surface 170 than the other such that the camming surfaces 166 each extend helically with respect to the axis of rotation 122. The tape reels 112 have oppositely handed camming surfaces 166. That is, on one tape reel, when viewed in plan, the end of the camming surfaces 166 that is closest to the locating surface 170 is the end that leads when the tape reel is rotated clockwise, whereas the corresponding end of the camming surfaces of the other tape reel is the end that leads when the reel is rotated anticlockwise.

The hub 160 is surrounded by a C-shaped skirt 176 onto which the magnetic tape is wound. The end of the hub 160 opposite to the end defining the locating surface 170 is provided with an annular gear 178. The annular gear 178 is engageable by a locking member, or members, fixed to the cartridge housing 118 and not shown in the drawings. When so engaged, the tape reels 112 cannot rotate relative to the cartridge housing 118. This is to prevent the magnetic tape from unwinding when the tape cartridge is not in use. Suitable means are provided in the cartridge housing for automatically releasing the locking members as a part of the cartridge loading process so that when the tape cartridge 100 moves into its loaded position, the tape reels 112 are freely rotatable so that they can be turned by the reel drive members 114. Mechanisms for locking tape reels 112 and allowing automatic release in this way will be known to those skilled in the art and any suitable known locking mechanism can be used.

Figure 8:
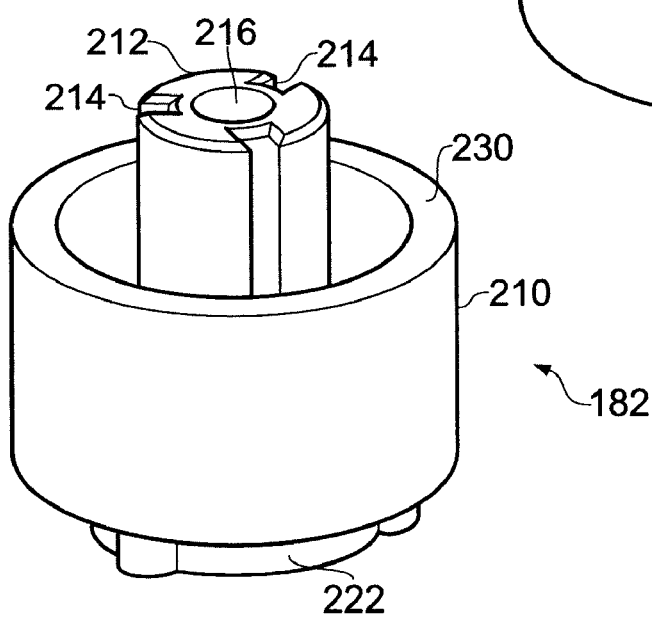
FIG. 8 is a perspective view of a second part of the reel drive member of FIG. 4 as viewed from above in FIG. 4.

Referring to FIGS. 4, 5, 7 and 8, the reel drive member 114 comprises a first part 180 (FIG. 7) and a second part 182 (FIG. 8). The first part 180 is the free, or leading, end of the reel drive member and, in use, engages the tape reel. The second part 182 supports the first part and connects it to the direct drive motor 144 that supplies the torque used to drive the reel drive member.

The first part 180 of reel drive member 114 comprises a tubular body 184 that has a leading end surface 186. The leading end surface 186 is provided with a shallow recess that defines a shoulder 188 for a screw 190 used to secure the first part 180 to the second part 182 (the screw can be seen in FIG. 4, but has been omitted from FIG. 5 to allow other features of the assembly to be seen). The inner cylindrical surface of the tubular body 184 is provided with three axially extending ribs 192. The ribs 192 extend axially inwardly from the shoulder 188 along a portion of the length of the tubular body 184 and, as will become apparent from the description of the second part 182 that follows, transmit torque between the two parts while allowing sliding movement of the first part relative to the second part.

The outer cylindrical surface of the tubular body 184 is provided with three engagement formations 194 for cooperably engaging the camming surfaces 166 of the tape reel engagement formations 164 for clamping the tape reel 112 to the reel drive member 114. In the same way as the tape reel engagement formations 164, the engagement formations 194 are equi-angularly spaced with respect to the axis of rotation 122 of the tape reel. The engagement formations 194 are generally diamond-shaped projections that have a pair of relatively longer sides 196 that meet adjacent the leading end surface 186 to form a radiussed peak 198 and a pair of relatively shorter sides 200 that meet to form a radiussed cam follower surface 202 disposed opposite the peak 198 and pointing away from the leading end surface 186 towards the opposite end 204 of the tubular body 184.

The tubular body 184 and engagement formations 194 are sized such that the first part 180 of the reel drive member 114 can freely enter the hub 160 of the tape reel 112 clear of the inner cylindrical surface 162.

The second part 182 of the reel drive member 114 comprises a cup-shaped body portion 210. A spigot 212 extends axially from the body portion 210 and protrudes from its open end. The spigot 212 is a sliding fit in the tubular body 184 and is provided with three axially extending grooves 214 shaped to receive the ribs 192 so as to guide sliding movement of the tubular body on the spigot and transmit torque from the second part 182 to the first part 180. In this embodiment the ribs and grooves have a generally rectangular cross-section. However, this is not essential and any suitable shape, for example a generally triangular cross-section, may be used. As one alternative to using inter-engaging grooves and ribs, the spigot may be provided with flats (i.e., one or more flat surfaces extending along its length) and the bore of the tubular body 184 provided with mating flats. In one embodiment, the flats may be extended in width to the extent the spigot has a polygonal cross-section. For example, the spigot could have a hexagonal cross-section, in which case, the bore of the tubular body would be made hexagonal.

The first part 180 of the reel drive member 114 is secured to the second part 182 by the screw 190, which seats on the shoulder 188 and is screwed into a threaded bore 216 (FIG. 5) that extends axially inwardly from the free end of the spigot 212. A compression spring 218 (FIG. 4) is fitted around the spigot 212 and between the end 204 of the tubular body 184 and a transverse end wall 220 of the cup-shaped body portion 210. The compression spring 218 pushes the first part 180 of the reel drive member 114 in the direction of the free end of the reel drive member so that the shoulder 188 is pressed against the head of the screw 190.

The end wall 220 of the cup-shaped body portion 210 is provided with a lobed projection 222 that is fixed in a correspondingly shaped aperture in a dish 224. The magnets (not shown) of the servo motor 144 are connected to the dish 224. A stepped bore 226 extends axially inwardly from the free end of the lobed projection 222 into the spigot 212. The bore 226 receives a shaft (not shown) of the servo motor 144 and has a bearing 228 fitted at its inner end such that the cup-shaped body portion 210 is supported for rotation on the shaft. When the coils of the servo motor are energised, the dish 224 is caused to rotate and that rotation is transmitted to second part 182 via the lobed projection 222 and from the second part to the first part 180 via the interengaging grooves 214 and ribs 192.

The open end of the cup-shaped body portion 210 defines an annular tape reel locating surface 230 that is transverse to the axis of rotation 122.

When a tape cartridge 100 is inserted into the data transfer apparatus 102, it is received in the cartridge loading device 138. The cartridge loading device 138 automatically transports the cartridge to a loaded position at which the tape reels 112 are engaged by the respective first parts 180 of the reel drive members 114 entering the tape reels. During the tape loading process, the tape cartridge lid 124 (FIG. 2) is pivoted open to expose the magnetic tape to the transport mechanism and the locking members engaging the annular gears 178 of the tape reels 112 are disengaged so that as they approach the reel drive members 114, the tape reels are free to rotate relative to the cartridge housing 118.

If the reel drive member engagement formations 194 are in line with the tape reel engagement projections 164 as the tape reels move into engagement with the reel drive members 114, the tape reel engagement formations engage the peak 198, or a sidewall 196, which causes a small rotation of the respective tape reel 112 that is sufficient to allow the tape reel engagement formations 164 to move past the opposing engagement formations 194.

Once the cartridge loading device 138 reaches the loaded position, the locating surfaces 170 of the tape reels 112 engage, or are adjacent, the tape reel locating surfaces 230 of the respective reel drive members 114. The direct drive motors 144 are then operated to turn the two reels a small distance to tension the magnetic tape. The direct drive motors 144 are rotated in opposite directions to do this. The rotation of the tape reels 112 brings the camming surfaces 166 of the tape reel engagement formations 164 into engagement with the cam follower surfaces 202 of the engagement projections 194. This applies an axially directed force to the tape reels 112 that presses the locating surfaces 170 against the respective tape reel locating surfaces 230. The tape reels 112 are in effect clamped to the reel drive members 114 such that they can be driven by the reel drive members and cannot tip with respect to the reel drive members.

It will be appreciated that if the left hand (as viewed from above) tape reel 112 is drawing tape from the right hand tape reel, the reels rotate clockwise, whereas when the right hand tape reel is drawing tape from the left hand tape reel, they rotate anticlockwise. This is why the two tape reels have oppositely handed camming surfaces 166. When the tape reels are in motion, the direct drive motor 144 attached to the tape reel from which magnetic tape is being drawn is operated to apply a torque to that reel opposing the torque applied by the servo motor attached to the reel onto which the tape is drawn. The opposing torque is insufficient to prevent the two reels from rotating in the same direction, but applies a sufficient drag on the reel from which the tape is drawn to ensure the camming surfaces 166 of that reel remain engaged with the formations of the respective reel drive member 114.

When operations on the tape cartridge 100 are complete, the controller 150 causes the tape cartridge loading device 138 to commence lifting the tape cartridge away from the reel drive members 114. The upward movement of the tape cartridge 100 should be sufficient to break the engagement of the camming surfaces 166 and the cam follower surfaces 202 and cause a small rotation of the tape reels 112 as the ramp engaging faces move back down the camming surfaces, so freeing the tape reels to allow the tape cartridge to be moved back through the door 134 for removal from the data transfer apparatus 102. As the tape cartridge 100 is raised away from the reel drive members 114, the engagement formations 164 of the tape reels 112 are deflected by the side walls 200 of the engagement formations 194, so ensuring that the unloading of the tape cartridge is not blocked by the engagement formations 194. It will be appreciated that if the ramp angle of the camming surfaces 166 is relatively shallow the clamping force holding the tape reels 112 on the reel drive members 114 will be greater than if the angle is relatively steep. If a relatively shallow angle is used, it may be necessary to operate the servo motors 144 to provide a release torque to the reel drive members at substantially the same time as the cartridge loading device 138 is operated to lift the cartridge away from the reel drive members. It will be appreciated that the release torque will act in a direction that moves the engagement formations 194 along the camming surfaces 166 such as to reduce the interference between the camming surfaces and the cam follower surfaces 202.

It will be appreciated that the data transfer apparatus 102 can be configured to accept a tape cartridge having a relatively large width tape, for example a tape with a nominal 8 mm width, and legacy format tape cartridges having a nominal 4 mm width tape. The larger width tape cartridge would have reels adapted to secure to the reel drive members in, for example, the way described with reference to FIGS. 4 to 8. In this case, the engagement formations 194 of the reel drive members 114 would be shaped such that they can additionally engage with the engagement formations of the legacy format tape to provide a drive torque to the tape reels in a manner at least equivalent to the machines the legacy format tape cartridge was designed to be used with. The problem of tape reel tipping should not occur, as the reel drive members will extend beyond the centre height of the narrower tape reels of the legacy format tape. A data transfer apparatus 102 configured to accept two or more widths of tape in this way may comprise a cartridge loading device comprising features of the cartridge locating devices disclosed in Hewlett-Packard Development Company LP's patent applications GB 2 419 728, GB 2 419 729, GB 2 419 730 and GB 2 419 731, the contents of which are incorporated herein by reference. Similarly, the data transfer apparatus may have a transport mechanism comprising features disclosed in Hewlett-Packard Development Company LP's patent applications GB 2 413 683, GB2 413 685, GB 2 413 688 and GB 05 21005.9, the contents of which are incorporated herein by reference.

In the embodiment, the tape reel 112 and first and second parts 180, 182 of the reel drive members 114 are each integral plastics mouldings. However, this is not essential and the three components could each be an assembly of parts.

It will be appreciated that it is not essential to have the camming surfaces on the tape reels. Instead, the camming surfaces could be provided on the reel drive members and the cam follower surfaces provided on the tape reels. In one embodiment, this could be achieved by swapping the engagement formations 164 and 194 between the tape reel 112 and reel drive member 114. This would, of course, require that the respective formations be turned vertically through 180°.

It will be appreciated that in the embodiment the arrangement of the tape reels and reel drive members is such that they are self-securing and this provides the benefit of not requiring additional mechanisms to actuate the securing features.

It will be appreciated that because the tape reels are secured to the reel drive members, they cannot tip relative to the cartridge housing, which avoids any risk they might tip and foul the housing.

It will be understood that while embodiment is concerned with dual reel tape cartridges, the invention is equally applicable to single supply reel tape cartridge technology.

It will be appreciated that although the embodiment is concerned with magnetic tape cartridge technology, the invention is equally applicable to optical tape cartridge technology.

It will be understood that although not shown, the tape reels 112 may be provided with flanges. The flanges may be integral or joined to the tape reel by any suitable means, such as ultrasonic welding.

The invention is particularly applicable to digital data tape cartridge technology and date exchange with computers, for example helical scan and linear tape technology, but can also be applied to video and audio tape cartridge technology.

In some embodiments, a tape cartridge comprises a tape reel that is rotatable about an axis of rotation and adapted to cooperably engage a reel drive member of a data transfer apparatus by rotation of the reel drive member relative to the tape reel in a direction for winding tape onto the tape reel. The cooperable engagement is such as to releasably fix the tape reel to the reel drive member such as to at least substantially prevent tipping of the tape reel with respect to the reel drive member. When, in use, the reel drive member applies a drive torque to the tape reel in the direction for winding tape onto the tape reel.

In some embodiments, a data transfer apparatus for use with tape cartridges comprises a tape reel. The apparatus comprises a reel drive member for cooperably engaging a tape reel of a tape cartridge received by the apparatus by rotation of the reel drive member relative to the tape reel. The cooperable engagement is such as to fix the tape reel to the reel drive member to at least substantially prevent tipping of the tape reel with respect to the reel drive member. When, in use, the reel drive member applies a drive torque to the tape reel on the direction for winding tape onto the tape reel.

Further, the apparatus comprises a tape loading device adapted to position first sized tape cartridges and second sized tape cartridges at a loaded position. The first sized tape cartridges contain a tape having a first specified width wound on the tape reel. The second sized tape cartridges contain a tape having a second specified width that is greater than the first specified width wound on the tape reel. The tape reels of the tape cartridges have opposed ends and a centre height that is midway between the ends. The reel drive member has a portion for entering the tape reel of the tape cartridge positioned at the loaded position through one of the ends. The arrangement is such that the cooperable engagement between the tape reel and reel drive member takes place at a location or locations disposed between the centre height and the one of the ends when the second sized tape is positioned at the loaded position.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A tape cartridge comprising a tape reel that is rotatable about an axis of rotation and adapted to cooperably engage a reel drive member of a data transfer apparatus which, in use, applies a drive torque to the tape reel to rotate the tape reel about said axis of rotation, said tape reel having opposite ends with a centre height that is midway between said ends and being adapted to receive a free end portion of a said reel drive member through one of said ends such that said cooperable engagement between the tape reel and the reel drive member takes place internally of the tape reel at a location or locations between said centre height and said one of the ends, and said cooperable engagement being such as to secure the tape reel to the reel drive member to at least substantially prevent tipping of the tape reel with respect to said reel drive member; wherein said tape reel comprises at least one camming surface that extends helically with respect to the axis of rotation and that is cooperably engageable by said reel drive member to secure the tape reel to the reel drive member.

2. A tape cartridge as claimed in claim 1, wherein said tape reel is adapted to cooperably engage the reel drive member to be secured to the reel drive member by rotation of the reel drive member relative to the tape reel in a direction of rotation for winding tape onto the tape reel.

3. A tape cartridge as claimed in claim 1, wherein said cooperable engagement provides an axially directed clamping force whereby said tape reel is clamped to the reel drive member.

4. A tape cartridge as claimed in claim 1, wherein said tape reel has a locating surface that is transverse to said axis of rotation and said cooperable engagement causes said locating surface to be pressed against an opposing transverse surface of the reel drive member whereby said tipping of the tape reel with respect to the reel drive member is at least substantially prevented.

5. A tape cartridge as claimed in claim 1, wherein said tape reel comprises formations for said cooperable engagement, said formations being arranged for said cooperable engagement with engagement formations provided on said reel drive member adjacent said free end portion of the reel drive member.

6. A tape cartridge as claimed in claim 1, wherein said tape reel comprises a hub having a bore therein that extends along said axis of rotation and said at least one camming surface is provided in said bore.

7. A data transfer apparatus for use with tape cartridges comprising a tape reel, said apparatus being arranged to receive at a loaded position tape cartridges containing a tape having a specified width wound on a tape reel that has opposed ends and a centre height that is midway between said ends and comprising a reel drive member for cooperably engaging a said tape reel of a tape cartridge received at said loaded position, said reel drive member having a portion for entering the tape reel through one of said ends such that said cooperable engagement between the tape reel and reel drive member takes place internally of the tape reel at a location or locations disposed between said centre height and said one of the ends and said cooperable engagement being such as to secure the tape reel to the reel drive member to at least substantially prevent tipping of the tape reel with respect to the reel drive member when, in use, said reel drive member applies a torque to rotate said tape reel about said axis of rotation;
wherein said reel drive member comprises a first part that, in use, cooperably engages the tape reel and a second part on which said first part is mounted, said first and second parts being arranged such that said first part is axially slideable relative to said second part and the second part can transmit said torque to the first part.

8. A data transfer apparatus for use with tape cartridges as claimed in claim 7, wherein said apparatus is arranged to receive at said loaded position first sized said tape cartridges containing a tape having a first said specified width and second sized said tape cartridges containing a tape having a second said specified width that is greater than said first specified width, said cooperable engagement taking place at said location or locations between said centre height and said one of the ends when a said second sized tape cartridge is received at said loaded position.

9. A data transfer apparatus for use with tape cartridges as claimed in claim 8, wherein said reel drive member is arranged to cooperably engage a tape reel of a said first sized tape cartridge at a location or locations further from said one of said ends than said centre height.

10. A data transfer apparatus for use with tape cartridges as claimed in claim 7, wherein said reel drive member has a transverse locating surface and said cooperable engagement causes an opposing surface of the tape reel to be pressed against said transverse locating surface whereby said tipping of the tape reel with respect to the reel drive member is at least substantially prevented.

11. A data transfer apparatus for use with tape cartridges as claimed in claim 7, wherein said reel drive member comprises at least one engagement formation for said cooperable engagement with said tape reel and provided at a free end region of said reel drive member.

12. A data transfer apparatus for use with tape cartridges as claimed in claim 7, wherein said reel drive member is adapted to cooperably engage the tape reel to secure the tape reel to it by rotation relative to the tape reel in the direction for winding tape onto the tape reel.

13. A data transfer apparatus for use with tape cartridges as claimed in claim 7, wherein said cooperable engagement provides an axially directed clamping force whereby said tape reel is clamped to the reel drive member.

14. A method of operating a data transfer apparatus for use with tape cartridges, said method comprising bringing a tape reel of a said tape cartridge that is rotatable about an axis of rotation into cooperable engagement with a reel drive member of the data transfer apparatus such that the tape reel is secured to the reel drive member by, in part, at least one helical camming surface provided on said tape reel such as to at least substantially prevent tipping of the tape reel with respect to the reel drive member, the tape reel having opposed ends and a centre height midway between said ends and being adapted to receive a free end portion of the reel drive member and said cooperable engagement between the tape reel and the reel drive member being at a location or locations between said centre height and an opening through which said free end portion enters the tape reel.

15. A method of operating a data transfer apparatus for use with tape cartridges as claimed in claim 14, wherein bringing said tape reel into cooperable engagement with the reel drive member comprises moving said tape reel axially onto the reel drive member and rotating said reel drive member in a first direction relative to said tape reel, said first direction being the direction for winding tape onto the tape reel.

16. A method of operating a data transfer apparatus for use with tape cartridges as claimed in claim 14, comprising releasing the tape reel from said secured cooperable engagement by applying an axial force in the direction opposite to the axial movement of the tape reel onto the reel drive member.

17. A method of operating a data transfer apparatus for use with tape cartridges as claimed in claim 14, comprising releasing the tape reel from said secured cooperable engagement by rotating the reel drive member relative to the tape reel in a direction opposite to said first direction.

* * * * *

UNITED STATES PATENT AND TRADEMARK OFFICE
CERTIFICATE OF CORRECTION

| | | |
|---|---|---|
| PATENT NO. | : 8,045,289 B2 | Page 1 of 1 |
| APPLICATION NO. | : 12/023153 | |
| DATED | : October 25, 2011 | |
| INVENTOR(S) | : Philip Turner et al. | |

It is certified that error appears in the above-identified patent and that said Letters Patent is hereby corrected as shown below:

On the face page, in field (54) and in column 1, line 4, Title, after "HAVING" insert -- HELICAL --.

Signed and Sealed this
Seventeenth Day of July, 2012

David J. Kappos
*Director of the United States Patent and Trademark Office*